(12) United States Patent
Wei et al.

(10) Patent No.: US 10,789,226 B2
(45) Date of Patent: Sep. 29, 2020

(54) METHOD AND APPARATUS FOR DATA PROCESSING

(71) Applicant: ALIBABA GROUP HOLDING LIMITED, George Town, Grand Cayman (KY)

(72) Inventors: Chuangxian Wei, Hangzhou (CN); Yue Pan, Hangzhou (CN); Bowen Zheng, Hangzhou (CN); Jienan Zeng, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 246 days.

(21) Appl. No.: 15/343,761

(22) Filed: Nov. 4, 2016

(65) Prior Publication Data

US 2017/0124130 A1 May 4, 2017

(30) Foreign Application Priority Data

Nov. 4, 2015 (CN) .......................... 2015 1 0742561

(51) Int. Cl.
*G06F 16/00* (2019.01)
*G06F 16/22* (2019.01)
(Continued)

(52) U.S. Cl.
CPC ........ *G06F 16/2228* (2019.01); *G06F 16/128* (2019.01); *G06F 16/2372* (2019.01); *G06F 16/27* (2019.01)

(58) Field of Classification Search
None
See application file for complete search history.

(56) References Cited

U.S. PATENT DOCUMENTS

| 5,920,873 | A | 7/1999 | Van Huben et al. |
| 7,457,982 | B2 * | 11/2008 | Rajan ..................... G06F 16/10 |
| | | | 714/15 |

(Continued)

FOREIGN PATENT DOCUMENTS

| CN | 103473277 | 12/2013 |
| CN | 103761053 | 4/2014 |
| CN | 104484471 A | 4/2015 |

OTHER PUBLICATIONS

PCT International Search Report and Written Opinion dated Jan. 31, 2017, issued in corresponding International Application No. PCT/US16/60616 (12 pages).

(Continued)

*Primary Examiner* — Debbie M Le
(74) *Attorney, Agent, or Firm* — Finnegan, Henderson, Farabow, Garrett & Dunner, LLP (57) ABSTRACT

This application generally relates to data processing methods and apparatus. One data processing method disclosed herein comprises: creating a Writable Snapshot based on data modification; creating a plurality of Read-Only ("RO") Snapshots by cloning the Writable Snapshot at distinct predetermined creation-times; receiving a data inquiry request; and conducting the data inquiry through indexing, in a RO Snapshot with a latest creation-time. This approach achieves separation of data modification and data inquiry, enabling efficient real-time updating. Further, by fast indexing and invert indexing, inquiry efficiency is further improved. Additionally, data is stored in data columns, wherein each column may be divided into multiple data blocks according to a fixed block size, and each data block has a same length. When modifying data, effect of the modification may be limited to the data blocks being modi- (Continued)

fied, without affecting the other data blocks, which reduces resource consumption incurred by data modification.

20 Claims, 4 Drawing Sheets

(51) Int. Cl.
*G06F 16/27* (2019.01)
*G06F 16/23* (2019.01)
*G06F 16/11* (2019.01)

(56) References Cited

U.S. PATENT DOCUMENTS

| | | | | |
|---|---|---|---|---|
| 7,555,504 B2* | 6/2009 | Bixby | ............... | G06F 16/128 |
| 7,587,563 B1* | 9/2009 | Teterin | ............ | G06F 11/1435 |
| | | | | 711/161 |
| 8,600,939 B2* | 12/2013 | Shoens | ............ | G06F 17/3023 |
| | | | | 707/639 |
| 8,768,977 B2* | 7/2014 | Golab | ............ | G06F 17/30309 |
| | | | | 707/797 |
| 9,021,309 B2* | 4/2015 | Sim-Tang | ......... | G06F 16/211 |
| | | | | 714/38.1 |
| 9,146,877 B2* | 9/2015 | Ezra | .................. | G06F 3/0614 |
| 9,311,016 B2* | 4/2016 | Ezra | .................. | G06F 3/0614 |
| 9,529,808 B1* | 12/2016 | Sudarsanam | ....... | G06F 11/1464 |
| 9,817,835 B2* | 11/2017 | Sudarsanam | ..... | G06F 17/30088 |
| 9,928,003 B2* | 3/2018 | Barve | ................ | G06F 3/065 |
| 9,946,604 B1* | 4/2018 | Glass | ................. | G06F 3/065 |
| 10,311,151 B2* | 6/2019 | Tabaaloute | ......... | H04L 67/1095 |
| 2005/0065986 A1 | 3/2005 | Bixby et al. | | |
| 2013/0066931 A1 | 3/2013 | Lacapra et al. | | |
| 2014/0365533 A1 | 12/2014 | Debray et al. | | |
| 2016/0350325 A1* | 12/2016 | Wang | ................. | G06F 3/0608 |

OTHER PUBLICATIONS

Communication from the European Patent Office enclosing the Extended European Search Report including, pursuant to Rule 62 EPC, the supplementary European search report (Art 153(7) EPC) and the European search opinion for Application No. 16863073.9, dated Jul. 31, 2018, 2018, 8 pgs.

First Search Report Issued by the State Intellectual Property Office of People's Republic of China in corresponding Chinese Application No. 2015407425613, dated Sep. 26, 2019 (1 page).

Supplemental Search Report Issued by the State Intellectual Property Office of People's Republic of China in corresponding Chinese Application No. 2015407425613, dated Jun. 28, 2020 (1 page).

Second Office Action Issued by the State Intellectual Property Office of People's Republic of China in corresponding Chinese Application No. 2015407425613, dated Jul. 3, 2020 (1 page).

* cited by examiner

METHOD AND APPARATUS FOR DATA PROCESSING

CROSS REFERENCE TO RELATED APPLICATION

This patent application claims priority to Chinese Patent Application No. 201510742561.3, filed Nov. 4, 2015, the entire content of which is incorporated herein by reference.

TECHNICAL FIELD

The present disclosure generally relates to the field of data processing, and more particularly, to methods of data processing and data processing apparatuses.

BACKGROUND

Many existing data processing methods are based on OLTP (On-Line Transaction Processing) databases, OLAP (Online Analytical Processing) databases, and Infobright databases. OLTP databases, which are most commonly used, use transaction log methods to maintain consistency of inserting, updating, and deletion records. Specifically, at the beginning of every time period (a day, a week, or a month), a new data sheet is created. The acquired data is imported into this new data sheet, and new static index is created. After the creation of the new static index, efficient inquiry may be supported, but real-time data updating is not. OLAP databases use batch data importation mode, which does not support real time data inquiry. With regard to Infobright databases, data inquiry can only be conducted after batch data updating is completed, and the updating speed is therefore slow. Moreover, Infobright databases do not support historical version data inquiry, and thus cannot be extended and used in distributed database systems.

In view of the above, there is a need for data processing methods that support fast data update and data inquiry.

SUMMARY OF THE INVENTION

In view of the above defects of existing techniques, the present invention discloses data processing methods applicable in data storage systems comprising a plurality of Read-only Snapshots ("RO Snapshots") and one Writable Snapshot, wherein the creation-times of the RO Snapshots are different. A data processing method disclosed herein comprises:

Creating a Writable Snapshot based on data modification;

Creating a plurality of Read-Only ("RO") Snapshots by cloning the Writable Snapshot at distinct predetermined creation-times;

Receiving a data inquiry request; and

Conducting the data inquiry through indexing, in a RO Snapshot with a latest creation-time.

The present invention further provides data processing apparatus. A data processing apparatus disclosed herein comprises:

A first creation module, used for: creating a Writable Snapshot based on data modification;

A second creation module, used for: creating a plurality of Read-Only ("RO") Snapshots by cloning the Writable Snapshot at distinct predetermined creation-times; and An inquiry module, used for: receiving a data inquiry request, and conducting the data inquiry through indexing, in a RO Snapshot with a latest creation-time.

Compared to existing technology, the present invention discloses: creating a Writable Snapshot based on data modification; creating a plurality of Read-Only ("RO") Snapshots by cloning the Writable Snapshot at distinct predetermined creation-times; receiving a data inquiry request; and conducting the data inquiry through indexing, in a RO Snapshot with a latest creation-time. In this way, data modification and data inquiry are separated, which enables fast real-time updating. Further, based on fast indexing and invert indexing, the present invention improves inquiry efficiency. Additionally, by storing data in columns, wherein each column may be divided into a plurality of data blocks based on a fixed block size, each data block has the same length, therefore, when modifying data, the effect of the modification can be limited to the particular data blocks where modification is performed, without affecting the other data blocks. This may reduce resource consumption incurred in the modification process.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The present invention provides data processing methods that can be applied in data storage systems with a plurality of RO Snapshots and a Writable Snapshot, wherein the creation-times of the RO Snapshots are different. The RO Snapshots and the Writable Snapshot store data information of the data (including description information, and position information of the data), rather than the data itself. As the data is constantly updated, after every time interval, a RO Snapshot is created based on the description information and position information of the current data, while the Writable Snapshot is created based on current modification to the data.

Figure 1:
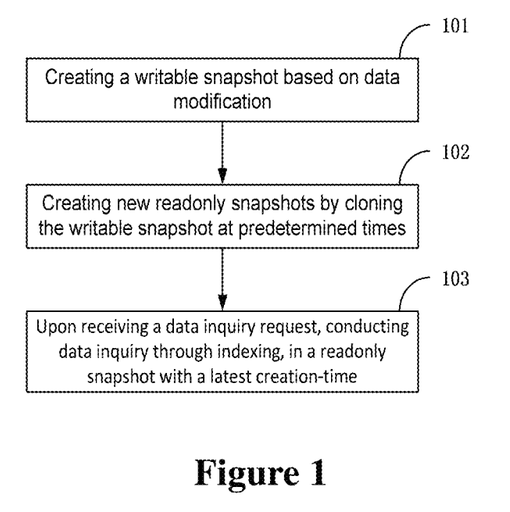
FIG. 1 is a flowchart of a data processing method, according to an exemplary embodiment.

Referring to FIG. 1, a method according to an exemplary embodiment comprises:

Step 101, creating a Writable Snapshot based on data modification.

Specifically, creating a Writable Snapshot may comprise:

Step A, determining a RO Snapshot with the latest creation-time;

Step B, duplicating the data information in the determined RO Snapshot into a preset snapshot;

Step C, determining a position of the data to be modified in the preset snapshot, modifying data, and updating data information in the preset snapshot based on the data modification; and Step D, creating a Writable Snapshot based on the updated data information in the preset snapshot.

As an example for illustration purposes, there were 30 students originally in a class, each student corresponding to a data item. RO Snapshots are created based on the student information (including description information and position information). The RO Snapshot with the latest creation-time, for example, RO Snapshot 1, stores description information of the 30 students, including, for example, name, gender, age, ethnic group, and their position information in the class. For example, the position information may be row 2, seat 2.

When there is a new student joining the class, the data (with the information of the 30 students) in RO Snapshot 1 is duplicated into a preset blank snapshot. After duplication, a position of the new student is determined based on the preset snapshot, and the new student is placed based on the determined position. In fact, as data is modified, the Writable Snapshot changes. The Writable Snapshot is the preset snapshot after duplicating the RO Snapshot with the latest creation-time. After determining the position of the $31^{st}$ student and then placing the $31^{st}$ student based on the preset snapshot, the preset snapshot is correspondingly modified, and the final Writable Snapshot includes the description information of 31 students and their corresponding positions. The data information stored in the Writable Snapshot corresponds to the most current data.

Figure 2:
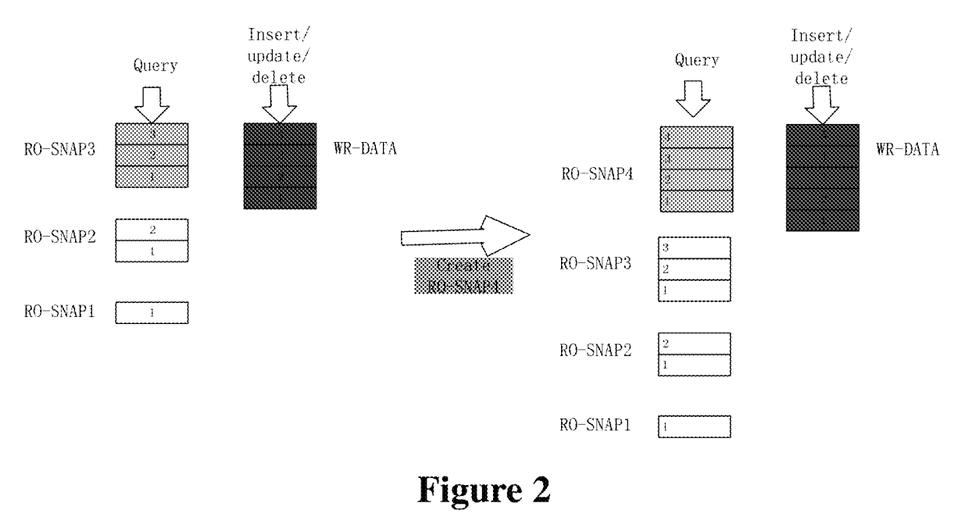
FIG. 2 is a schematic diagram illustrating a process of creating a Writable Snapshot, according to an exemplary embodiment.

In subsequent data inquiries, all inquiries can be run on any one of the RO Snapshots (for example, RO-SNAP1, RO-SNAP2, and RO-SNAP3, as shown in FIG. 2). As different RO Snapshots correspond to data of different times, with the RO Snapshots, the status of the latest data or status of historical data may be inquired, without affecting inquiry in other RO Snapshots, or creation of the Writable Snapshot. Further, data can be modified while one or more data inquiries are being conducted, therefore enabling efficient data inquiry and modification.

If the information of the current data is to be inquired, the inquiry may preferably be based on the latest RO Snapshot (the newer it is, the newer the data therein). There is only one Writable Snapshot, which is updated based on all real-time data modification. As shown in FIG. 2, when it is needed to insert a new data item 4, based on the latest RO Snapshot RO-SNAP3, the final Writable Snapshot created, WR-DATA, includes the three data items in RO-SNAP3, and the new data item 4. It is contemplated that there are other ways to name the RO Snapshots and the Writable Snapshot, which is not limited to the above-description. Every snapshot stores therein the data information (including description information and position information) of the data in the previous snapshot, plus the added data compared to the previous snapshot. There is only one set of actual data, so storage space can be effectively reduced. At preset intervals (for example, every 60 seconds), a RO Snapshot may be automatically created by cloning the current Writable Snapshot, for example, a RO-SNAP4 may be created by cloning the Writable Snapshot WR-DATA. When data inquiry requests are received, inquiry may be conducted only based on RO Snapshots, which may be the RO Snapshot with the latest creation-time, or other RO Snapshots created at other historical times.

Figure 3:
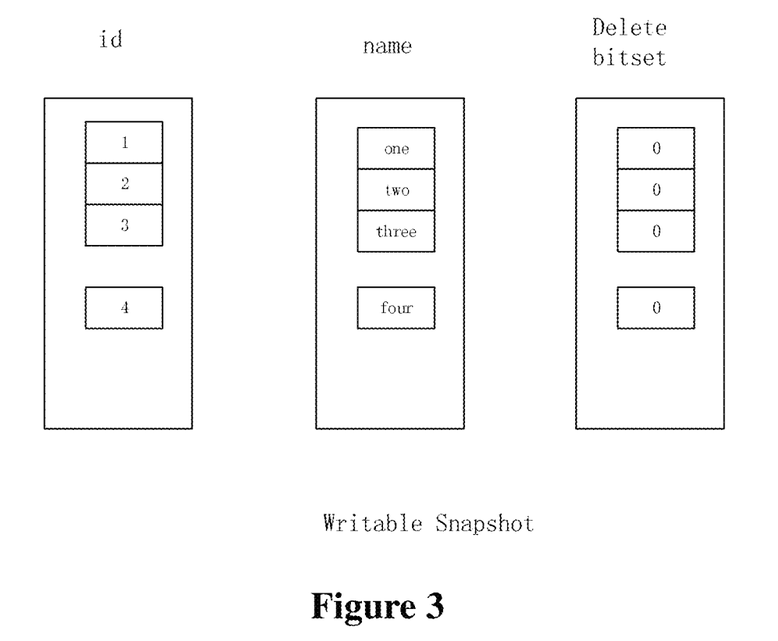
FIG. 3 is a schematic diagram illustrating a structure of a snapshot, according to an exemplary embodiment.

Specifically, the structure of the RO Snapshots may be consistent with the structure of the Writable Snapshot, wherein data is stored in data columns. Every column may comprise one or more data blocks, each data block having the same number of data sub-blocks, as shown in FIG. 3, which is a storage structure of a table with two columns (id and name). Every column has three blocks. "Delete bitset" is a label representing whether the data in the corresponding row is deleted. In particular application scenarios. It is contemplated that other data labels may be set according to actual needs, to represent status of the corresponding data. In FIG. 3, there are 4 records in the snapshot, (1, "one"), (2, "two"), (3, "three"), (4, "four"). Certainly, other than the above, there may be other data records, for example, numbers of the students, names of the corresponding students, height, weight and so on.

Specifically, data modification may comprise: insert, update, and delete. In view of this, Step C—determining a position of the data to be modified in the preset snapshot, modifying data, and updating data information in the preset snapshot based on the data modification—may comprise:

(1) When it is needed to insert data, determining a data sub-block where the data is to be inserted in the preset snapshot, inserting data in a position corresponding to the determined data sub-block in a storage space, and updating data information in the preset snapshot based on data information of the inserted data.

Figure 4:
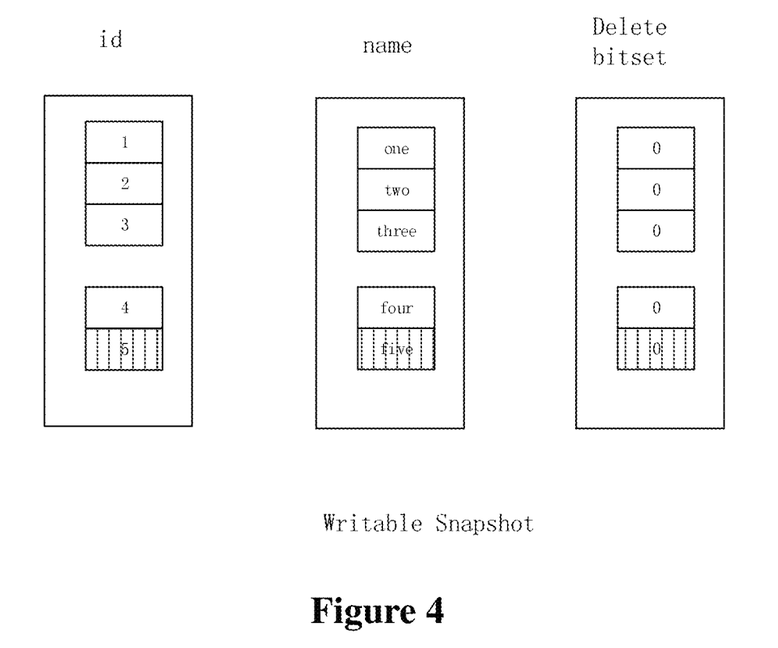
FIG. 4 is a schematic diagram illustrating a structure of a Writable Snapshot after data insertion, according to an exemplary embodiment.

During the data "Insert" process, after executing "SQL insert into table (id, name) values (5, "five")," namely, after inserting data item 5, the storage structure of the snapshot may be changed. FIG. 4 illustrates such a change in the storage structure of the snapshot. The preset snapshot, namely, the initial Writable Snapshot, is used to determine a position of the data sub-block where the data will be inserted, for example, it may be determined as position 1 in the data sub-block 1. In the process of inserting the actual data, the processor may find a position where the actual data is stored in the data storage space. The position corresponds to the determined position in the Writable Snapshot (for example, position 1 in the data sub-block 1). The processor may then insert data in the determined position where the actual data is stored. At the same time, the Writable Snapshot may be updated correspondingly based on the data insertion. Other data modification processes are similar to this.

(2) When it is needed to delete data, determining a data sub-block where the data to be deleted is located, deleting data in a position corresponding to the position of the determined data sub-block in the data storage space, and changing the data label of the determined data sub-block where the data to be deleted is located to "deleted" in the preset snapshot.

Figure 5:
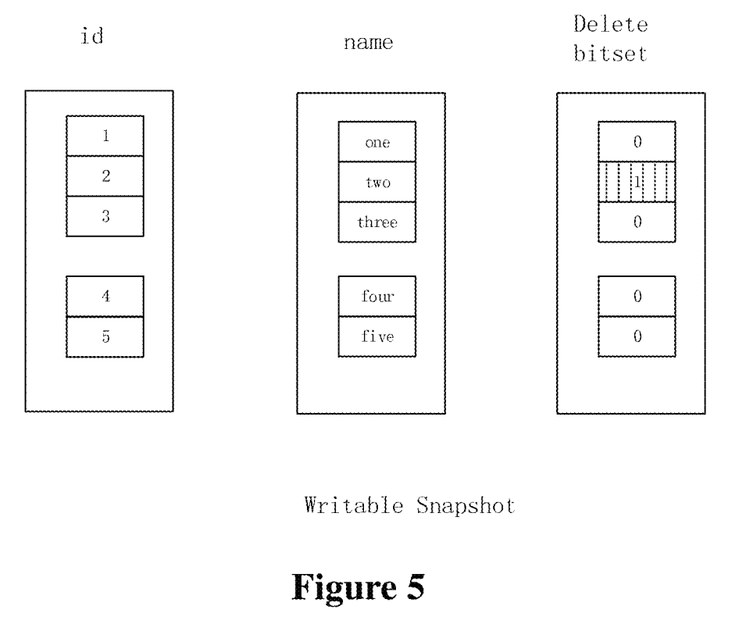
FIG. 5 is a schematic diagram illustrating a structure of a Writable Snapshot after data deletion, according to an exemplary embodiment.

In the process of data "Delete," to execute "SQL delete from table where id=2," namely, deleting data item 2, it may be done by only marking the second row of the bitmap as 1, without actually deleting the data item 2, thus avoiding affecting the other data. The structure of a Writable Snapshot created is shown in FIG. 5.

(3) When is it needed to update data, determining a data block where the data to be updated is located, duplicating the determined data block, determining a data sub-block where the data to be updated is located in the duplicated data block, updating data in a position corresponding to the determined data sub-block in the data storage space, creating an updated data block, and replacing the corresponding data block in the preset snapshot with the updated data block.

Figure 6:
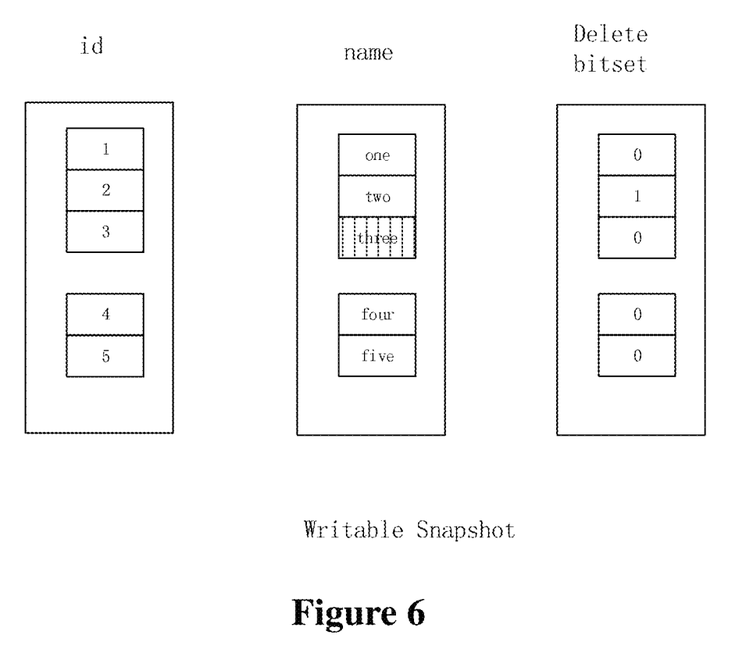
FIG. 6 is a schematic diagram illustrating a structure of a Writable Snapshot after data update, according to an exemplary embodiment.

In the process of data "Update," when executing "SQL update table set name="san" where id=3," namely, updating data item 3, the processor may determine data item 3 is in data block 1 (including data 1, data 2, and data 3, which respectively corresponds to one, two, three), copy data block 1, set the third row of the newly copied data block as "san," and replace data block 1 with updated data block 1. The storage structure of the Writable Snapshot created is shown in FIG. 6.

Step 102: creating new RO Snapshots by cloning the Writable Snapshot at predetermined times.

The specific process may be shown in FIG. 2, namely, making a copy by cloning.

Step 103: upon receiving a data inquiry request, conducting data inquiry through indexing, in a snapshot with the latest creation-time.

Specifically, data inquiry may be conducted when the data inquiry request is received, or during data processing as described above, conducting data inquiry when locating the position where processing is needed. When a plurality of data items stored in the data blocks comprise numerical values, inquiry may be conducted in the following two manners:

Manner 1:

Upon receiving a data inquiry request, determining a numerical value of the data being inquired, based on the data inquiry request;

Determining a RO Snapshot with the latest creation-time, and data blocks in the determined RO Snapshot, and determining numerical value ranges of the data in each data block;

Screening each data block based on a determination of whether the numerical value of the data being inquired falls within the numerical value ranges;

Completing the data inquiry by scanning the screened data blocks and conducting numerical value matching.

Specifically, with respect to each data block, recording the maximum and minimum values of the data block, and conducting equivalence and range inquiry. Only when the equivalence and range overlap with the maximum and minimum values of the data block, the data block will be scanned; if there is no overlap, the respective data block may be skipped, thus improving inquiry efficiency.

For example, the maximum value of the first data block in column "id" is 3, and the minimum value is 1. When the inquiry SQL is "select * from table where id=2," because 2 is within the range [1,3], this data block will be scanned, and the search result will be (2, "two");

For another example, when the inquiry SQL is "select * from table where id=4," because 4 is not within the range [1,3], it may be determined that this data block does not meet the requirement, and can be skipped.

Further, when the inquiry SQL is "select * from table where id between 2 and 4," because there is an overlap between [2,4] and [1,3], the data block [1,3] will be scanned, and the search result will be (2, "two"), (3, "three");

When the inquiry SQL is "select * from table where id between 4 and 5," because there is no overlap between [4,5] and [1,3], it may be determined that this data block does not meet the requirement, and may be skipped.

Manner 2:

Upon receiving a data inquiry request, determining a numerical value of the data being inquired, based on the data inquiry request;

Creating data sequences with data in numerical order, based on the numerical values of data in each data block;

Completing the data inquiry, by searching in the data sequences using binary search and the numerical value of the data being inquired.

Specifically, in Manner 2, the "creating data sequences with data in numerical order, based on the numerical values of data in each data block" may comprise:

Creating data sequences with data in ascending numerical order, by creating invert indices for data in each data block.

Specifically, with regard to data columns that are frequently searched, using fast indexing in Manner 1 may not exclude all data blocks, and it may be necessary to create fast invert indices for each data block. An invert index is a numeric array with a length of the block size. The "i" st value of the array represents the position of the elements in the block arranged in ascending order.

Figure 7:
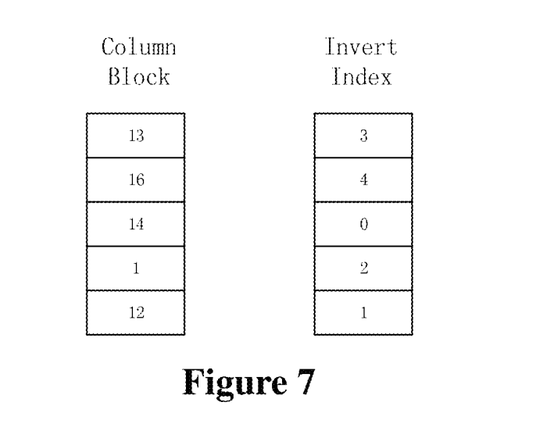
FIG. 7 is a schematic diagram illustrating an invert index, according to an exemplary embodiment.

As shown in FIG. 7, data stored in the data block are, sequentially, 13, 16, 14, 1, 12. Arranged in order, 13 takes the first position, and is placed in position 0, the rest are respectively: 16-1, 14-2, 1-3, 12-4. The minimum numerical value is data item 1 in the block, which corresponds to position 3, the second one is data item 12 (corresponds to position 4), the third one is data item 13 (corresponds to position 0), the fourth one is data item 14 (corresponds to position 2), and the largest value is 16 (corresponds to position 1). An invert index is created based on the above. Going through each element in the invert index, and using the elements as index to read the block values, an ordered sequence is obtained. As shown in FIG. 7, the first value in the invert index is 3. One can read 1 from the third element in the block (starting from 0). Similarly, the second value in the invert index is 4. Therefore, one can read 12 from the fourth element in the block. The rest may be obtained in the same manner. An ordered sequence may then be obtained: 1, 12, 13, 14, 16. For ordered sequences, binary search may be used, and equivalence or range inquiry may be conducted.

Specifically, regarding binary search, for example, data 1-100 are stored in a data block, and the data being inquired is 23. First, the median value of 1-100–50 may be searched for. The median value 50 may be compared with 23. Because 50 is larger than 23, the search may be continued and the median value of 1-50 may be compared with 23. This may improve search efficiency.

Figure 8:
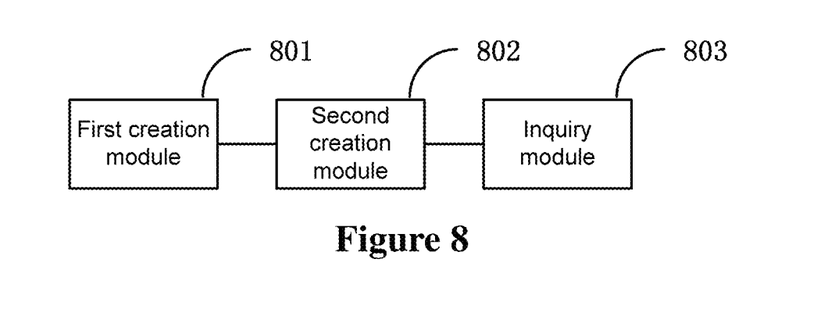
FIG. 8 is a block diagram of a data processing apparatus, according to an exemplary embodiment.

To further illustrate this invention, this application also provides data processing apparatus used for data storage systems with a plurality of RO Snapshots and a Writable Snapshot, wherein the creation-times of the RO Snapshots are different. As shown in FIG. 8, one data processing apparatus disclosed herein comprises:

A first creation module 801, used for: creating a Writable Snapshot based on data modification;

A second creation module 802, used for: creating a plurality of new RO Snapshots by cloning the Writable Snapshot at predetermined times; and Inquiry module 803, used for: upon receiving a data inquiry request, conduct data inquiry through indexing, in a RO Snapshot with the latest creation-time.

Specifically, the structure of the RO Snapshots may be consistent with that of the Writable Snapshot, wherein data is stored in data columns, each column comprises one or more data blocks, and each data block comprise a same number of data sub-blocks.

Optionally, the first creation module 801 may be used for:

Determining a RO Snapshot with the latest creation-time;

Duplicating the data information in the determined RO Snapshot into a preset snapshot;

Determining a position of the data to be modified in the preset snapshot, modifying data, and updating the data information in the preset snapshot based on the data modification; and Creating a Writable Snapshot based on the updated data information in the preset snapshot.

Specifically, data modification comprises: inserting data, deleting data, and updating data.

The step of "determining a position of the data to be modified in the preset snapshot, modifying data, and updating the data information in the preset snapshot based on the data modification," by the first creation module 801, comprises:

When it is needed to insert data, determining a data sub-block where the data to be inserted will be stored in the preset snapshot, inserting data in a position corresponding to the determined data sub-block in a data storage space, and updating the data information in the preset snapshot based on the data information of the inserted data;

When it is needed to delete data, determining a data sub-block where the data to be deleted is located, deleting the data in a position corresponding to the determined data sub-block in the data storage space, and labeling the determined data sub-block where the data to be deleted is located as "deleted" in the preset snapshot;

When it is needed to update data, determining a data block where the data to be updated is located, duplicating the determined data block, determining a data sub-block where the data to be updated is located in the duplicated data block, updating data in a position corresponding to the determined data sub-block in the data storage space, creating an updated data block, and replacing the corresponding data block in the preset snapshot with the updated data block.

Specifically, a plurality of data items stored in the data blocks may comprise numerical values.

The inquiry module 803 may be used for:

Upon receiving a data inquiry request, determining a numerical value of the data being inquired, based on the data inquiry request;

Determining the RO Snapshot with the latest creation-time, and data blocks in the preset snapshot, and determining a numerical value range of data in each data block;

Screening each data block based on a determination of whether the numerical value of the data being inquired falls within the numerical value ranges; and Completing the data inquiry by scanning the screened data blocks and conducting numerical value matching.

Alternatively, a plurality of data items stored in the data blocks may comprise numerical values.

The inquiry module 803 may be used for:

Upon receiving a data inquiry request, determining a numerical value of the data being inquired, based on the data inquiry request;

Creating data sequences with data in numerical order, based on the numerical values of data in each data block; and Searching in the data sequences using binary search and the numerical value of the data being inquired, to complete data inquiry.

Optionally, the step of "creating data sequences with data in numerical order, based on the numerical values of data in each data block," by inquiry module 803, may comprise:

Creating data sequences with data in ascending numerical order, by creating invert indices for data in each data block.

Some embodiments of this application provide: creating a Writable Snapshot based on data modification; creating new RO Snapshots by cloning the Writable Snapshot at predetermined times; and, upon receiving a data inquiry request, conducting data inquiry through indexing, in the RO Snapshot with the latest creation-time. This approach achieves separation of data modification and data inquiry, which improves efficient real-time updating. Further, by utilizing fast indexing and invert indexing, inquiry efficiency is further improved.

Embodiments of the present application may be implemented using hardware, software, firmware, or any combination thereof for allowing a specialized device to perform the functions described above. One or more steps, operations, functions, and modules described herein may be implemented by software instructions or codes stored in one or more memory devices and executed by one or more hardware processor devices. Exemplary hardware processor devices include logic gate circuitry configured or made to perform data processing and/or logic operations, integrated circuits (ICs) designed and made to perform specific functions, programmable gate arrays (PGAs), field-programmable gate arrays (FPGAs), etc.

Furthermore, one or more computer-readable storage media may be utilized in implementing embodiments consistent with the present disclosure. A computer-readable storage medium refers to any type of physical and/or non-transitory memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include RAM, ROM, volatile memory, nonvolatile memory, hard drives, CD ROMs, DVDs, flash drives, a flash memory, a cache, a register, disks, and any other known storage media.

A person of ordinary skill in the art may understand that the drawings only describe some exemplary and explanatory embodiments, and that modules/processes in the drawings may be optional in actual implementation.

A person of ordinary skill in the art may understand that the modules in the exemplary embodiments may be configured in the manner as described above, or may be modified and installed in one or more apparatuses. For example, multiple function modules may be integrated into a single physical device, or may be provided in separate physical devices. One of ordinary skill in the art will also understand that a plurality of the above described modules may be combined as one module, and each of the above described modules may be further divided into a plurality of sub-modules.

The order of the above exemplary embodiments is only for purpose of illustration, and does not represent superiority of certain embodiments.

It is contemplated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A data processing method performed by a processor included in a data storage system, the method comprising:
   duplicating, by the processor, data information associated with a read-only snapshot with a latest creation time into a preset snapshot, wherein the read-only snapshot stores data information in a data storage;
   updating the data information in the preset snapshot according to data modification in the data storage;
   creating a writable snapshot based on the updated data information in the preset snapshot;
   creating a plurality of read-only snapshots by cloning the writable snapshot at distinct predetermined creation-times, the read-only snapshots having a data structure that is consistent with a data structure of the writable snapshot;
   receiving a data inquiry request; and
   conducting the data inquiry through indexing, in a read-only snapshot among the plurality of read-only snapshots.

2. The method according to claim 1, wherein the data structure stores data in data columns, each data column including one or more data blocks, and each data block including a same number of data sub-blocks.

3. The method of claim 1, wherein the data modification is performed by:
   determining a position of target data in the preset snapshot; and
   modifying the target data in the data storage.

4. The method according to claim 1,
   wherein the data modification includes inserting data, and
   wherein the method further includes:
      determining a data sub-block where target data is to be stored in the preset snapshot;
      inserting the target data in a position corresponding to the determined data sub-block in the data storage; and
      updating the data information associated with the preset snapshot based on data information of the inserted data.

5. The method according to claim 1,
   wherein the data modification includes deleting data; and
   wherein the method further includes:
      determining a data sub-block where target data is stored in the preset snapshot;
      deleting the target data in a position corresponding to the determined data sub-block in the data storage; and
      changing a data label corresponding to the determined data sub-block in the preset snapshot to be deleted.

6. The method according to claim 1,
   wherein the data modification includes updating data; and
   wherein the method further includes:
      determining a data block where target data is stored in the preset snapshot;
      duplicating the determined data block;
      determining a data sub-block where the target data is stored in the duplicated data block;
      updating the target data in a position corresponding to the determined data sub-block in the data storage;
      creating an updated data block; and
      replacing a corresponding data block in the preset snapshot with the updated data block.

7. The method according to claim 2,
   wherein a plurality of data items stored in the data blocks include numerical values; and
   wherein conducting the data inquiry through indexing further includes:
      determining a numerical value of data being inquired, based on the data inquiry request;
      determining a read-only snapshot with a latest creation-time among the plurality of read-only snapshots;
      determining a numerical value range of each data block in the determined read-only snapshot; and
      screening each data block based on a determination of whether the numerical value of the data being inquired is within the numeral value ranges; and
      scanning the screened data blocks, and performing data matching to complete data inquiry.

8. The method according to claim 2,
   wherein a plurality of data items stored in the data blocks include numerical values; and
   wherein conducting the data inquiry further includes:
      determining a numerical value of data being inquired, based on the data inquiry request;
      creating data sequences, with data in an order of their numerical values, of data in each data block; and
      searching in the data sequences using binary search and the numerical value of the data being inquired, to complete the data inquiry.

9. The method according to claim 8, wherein creating data sequences further includes:
   creating data sequences with data in ascending numerical order by invert indexing the data in each data block.

10. A data processing apparatus used for a data storage system, comprising:
    a memory storing a set of instructions; and
    one or more processors configured to execute the set of instructions to cause the apparatus to perform:
       duplicating data information associated with a read-only snapshot with a latest creation time into a preset snapshot, wherein the read-only snapshot stores data information in a data storage;
       updating the data information in the preset snapshot according to data modification in the data storage;
       creating a writable snapshot based on the updated data information in the preset snapshot;
       creating a plurality of read-only snapshots by cloning the writable snapshot at distinct predetermined creation-times, the read-only snapshots having a data structure that is consistent with a data structure of the writable snapshot; and
       receiving a data inquiry request, and conducting the data inquiry through indexing, in a read-only snapshot among the plurality of read-only snapshots.

11. The apparatus according to claim 10, wherein the data structure stores data in data columns, each data column including one or more data blocks, and each data block including a same number of data sub-blocks.

12. The apparatus according to claim 10, wherein the data modification is performed by:
    determining a position of target data in the preset snapshot; and
    modifying the target data in the data storage.

13. The apparatus according to claim 10,
    wherein the data modification includes inserting data; and
    wherein the one or more processors are configured to execute the set of instructions to cause the apparatus to further perform:

determining a data sub-block where target data is to be stored in the preset snapshot;

inserting the target data in a position corresponding to the determined data sub-block in the data storage; and updating the data information associated with the preset snapshot based on data information of the inserted data.

14. The apparatus according to claim 10, wherein the data modification includes deleting data; and wherein the one or more processors are configured to execute the set of instructions to cause the apparatus to further perform:

determining a data sub-block where target data is stored in the preset snapshot;

deleting the target data in a position corresponding to the determined data sub-block in the data storage; and changing a data label corresponding to the determined data sub-block in the preset snapshot to be deleted.

15. The apparatus according to claim 10, wherein the data modification includes updating data; and wherein the one or more processors are configured to execute the set of instructions to cause the apparatus to further perform:

determining a data block where target data is stored in the preset snapshot;

duplicating the determined data block;

determining a data sub-block where the target data is stored in the duplicated data block;

updating the target data in a position corresponding to the determined data sub-block in the data storage;

creating an updated data block; and replacing a corresponding data block in the preset snapshot with the updated data block.

16. The apparatus according to claim 11, wherein a plurality of data items stored in the data blocks include numerical values; and wherein the one or more processors are configured to execute the set of instructions to cause the apparatus to further perform:

determining a numerical value of data being inquired, based on the data inquiry request;

determining a read-only snapshot with a latest creation-time among the plurality of read-only snapshots;

determining a numerical value range of each data block in the determined read-only snapshot; and screening each data block based on a determination of whether the numerical value of the data being inquired is within the numeral value ranges; and scanning the screened data blocks, and performing data matching to complete data inquiry.

17. The apparatus according to claim 11, wherein a plurality of data items stored in the data blocks include numerical values; and wherein the one or more processors are configured to execute the set of instructions to cause the apparatus to further perform:

determining a numerical value of data being inquired, based on the data inquiry request;

creating data sequences, with data in an order of their numerical values, of data in each data block; and searching in the data sequences using binary search and the numerical value of the data being inquired, to complete the data inquiry.

18. The apparatus according to claim 17, wherein creating data sequences further includes:

creating data sequences with data in ascending numerical order by invert indexing the data in each data block.

19. A non-transitory computer readable medium that stores a set of instructions that is executable by at least one processor of a data storage system to cause the data storage system to perform a method for data processing, the method comprising:

duplicating data information associated with a read-only snapshot with a latest creation time into a preset snapshot, wherein the read-only snapshot stores data information in a data storage;

updating the data information in the preset snapshot according to data modification in the data storage;

creating a writable snapshot based on the updated data information in the preset snapshot;

creating a plurality of read-only snapshots by cloning the writable snapshot at distinct predetermined creation-times, the read-only snapshots having a data structure that is consistent with a data structure of the writable snapshot;

receiving a data inquiry request; and conducting the data inquiry through indexing, in a read-only snapshot among the plurality of read-only snapshots.

20. The non-transitory computer readable medium according to claim 19, wherein the data modification is performed by:

determining a position of target data in the preset snapshot; and modifying the target data in the data storage.

* * * * *